United States Patent [19]
Havlovitz

[11] Patent Number: 5,597,092
[45] Date of Patent: Jan. 28, 1997

[54] COLLAPSIBLE DROP SPREADER

[75] Inventor: Paul M. Havlovitz, Escondido, Calif.

[73] Assignee: Republic Tool & Mfg. Corp., Carlsbad, Calif.

[21] Appl. No.: 372,579

[22] Filed: Jan. 13, 1995

[51] Int. Cl.$^6$ .................................................. B67D 5/22
[52] U.S. Cl. ........................... 222/45; 222/235; 222/474; 222/609; 222/611.1; 222/619; 222/625; 239/685
[58] Field of Search ................................. 222/45, 153.14, 222/609, 611.1, 613, 614, 619, 623, 624, 625, 235, 411, 473, 474; 239/669, 685, 689

[56] References Cited

U.S. PATENT DOCUMENTS

| | | | |
|---|---|---|---|
| 3,122,273 | 2/1964 | Atkinson | 222/41 |
| 3,310,314 | 3/1967 | Bylsma et al. | 275/15 |
| 3,773,229 | 11/1973 | Gandrud | 222/609 |
| 3,836,052 | 7/1974 | Chopieska | 222/624 X |
| 4,121,733 | 10/1978 | McRoskey | 222/43 |
| 4,273,264 | 6/1981 | Legg | 222/162 |
| 4,635,818 | 1/1987 | Glass | 222/41 |
| 4,671,434 | 6/1987 | Johnston et al. | 222/625 |
| 4,784,405 | 11/1988 | Stein | 280/655 |

Primary Examiner—Joseph Kaufman
Attorney, Agent, or Firm—Harry Williams

[57] ABSTRACT

A collapsible drop spreader having a hopper for supporting a wheel axle bearing member, an upper U-shaped frame pivotally connected to a pair of parallel leg members supported on the hopper for use as a handle for the spreader, the hopper further having wheel track alignment guide arrows indexed thereon, a series of material exit apertures extending the length thereof, a two-part rotary agitator bar disposed above the material exit apertures of the hopper, a spring washer for biasing the separate members of the agitator bar apart to effect a sealing relationship with the wheel axle bearing supports, a light weight fiber reinforced shut-off bar disposed adjacent the material exit apertures and rotatable about splines on the wheel axle bearing members, and a flexible cable having one end connected to the rotatably journaled shut-off bar and the other end thereof connected to a control lever located on the upper frame for rotating the shut-off bar from a closed position to an open position with respect to the material exit apertures.

13 Claims, 7 Drawing Sheets

FIG. 11

COLLAPSIBLE DROP SPREADER

BACKGROUND OF THE INVENTION

The present invention relates to portable spreaders of the drop kind which are supportable on a pair of wheels and which are manually pushed by the user thereof.

A somewhat related spreader is disclosed in my U.S. Pat. No. 5,288,017, issued Feb. 22, 1993 and assigned to the assignee of the present invention, the disclosure of which is incorporated herein by reference. In my aforementioned patent there is shown an articulated spreader of the broadcast kind having pre-assembled parts, including upper and lower frames having divergent leg members that can be assembled for use by the operator without the need of tools and can be collapsed as well into a generally prismatic-shaped package containing all the parts of the spreader. The broadcast spreader in my aforementioned patent uses a manual pull cable for controlling the rate of flow of material from the spreader hopper, an accordion-like shut-off plate for opening and shutting the material exit escape at the bottom of the hopper, and a gear box housing disposed below the broadcast rotor plate.

Another related spreader is disclosed in my co-pending application, directed to a broadcast spreader, Ser. No. 08/357,917, filed Dec. 16, 1994, and assigned to the same assignee as the present application, which application claims improvements on my aforementioned U.S. Pat. No. 5,288,017.

At present there is a need for a manually propelled drop spreader that is efficient in design, reliable in operation, and which makes economic use of its moving parts. There is also a need for improving the collapsibility feature of the spreaders above discussed, particularly the collapsibility of the rest or support member, as well as improving features specific to the operation of a drop spreader, such as the construction of the shut-off bar and the agitator bar as well as how these two members are operatively combined.

OBJECTS AND SUMMARY OF THE INVENTION

It is the principle object and primary purpose of the present invention to address the aforementioned needs and thus provide a collapsible drop spreader which is simple and reliable to use.

For example, one of the features of the present invention is to provide a tensioner device for the agitator bar that effectively seals the opposite ends of the bar where they are journaled for rotation in the hopper.

Another feature of the present invention is to provide a collapsible rest or support member that uses both high-strength metal tubing and pliable or bendable solid tubing.

Yet another feature of the present invention is to provide a guide for wheel track alignment so that the fertilizer or seed in the hopper can be distributed or dropped in consecutive and contiguous rows across a given area to be cultivated.

Yet another feature of the present invention is to provide a a shut-off bar with integral bearing journals that rotate in a bind-free manner about the axle bearing members for the hopper.

A further feature of the present invention is to provide a drop spreader that uses a micrometer adjustment device with a ratcheting setting lock feature that is simplified in construction and easy to operate from the control lever handle and provides accurate error-free adjustment for the flowrate of material from the hopper to accommodate the type or size of the granules or seeds being used in the hopper.

Still another feature of the present invention is a thumb-lock device for the flow-rate control handle that allows the operator to keep the hopper shut-off bar in its fully opened position without having to keep a hand on the control lever.

And yet another feature of the present invention is to include the aforementioned features in a completely preassembled portable wheeled drop spreader that is easily assembled into either a collapsed state for storage or an extended state for use and that requires no tools for assembly or disassembly, nor requires the removal of or the addition of any parts whatsoever, including controls, bolts and fasteners.

According to one embodiment of the invention there is provided a collapsible drop spreader having a hopper for supporting a wheel axle bearing member, an upper U-shaped frame pivotally connected to a pair of parallel leg members supported on the hopper for use as a handle for the spreader, the hopper further having wheel track alignment guide arrows indexed thereon, a series of material exit apertures extending the length thereof, a two-part rotary agitator bar disposed above the material exit of the hopper, a spring washer for biasing the separate members of the agitator bar apart to effect a sealing relationship with the wheel axle bearing supports, a light weight fiber reinforced shut-off bar disposed adjacent the exit apertures and rotatable about splines on the wheel axle bearing members, and a flexible cable having one end connected to the rotatably journaled shut-off bar and the other end thereof connected to a control lever located on the upper frame for rotating the shut-off bar from a closed position to an open position with respect to the material exit apertures.

The invention will be better understood as well as further features, objects and advantages thereof become more apparent from the ensuing detailed description taken in conjunction with the drawings.

DETAILED DESCRIPTION OF THE PREFERRED EMBODIMENTS

Figures 1, 2:
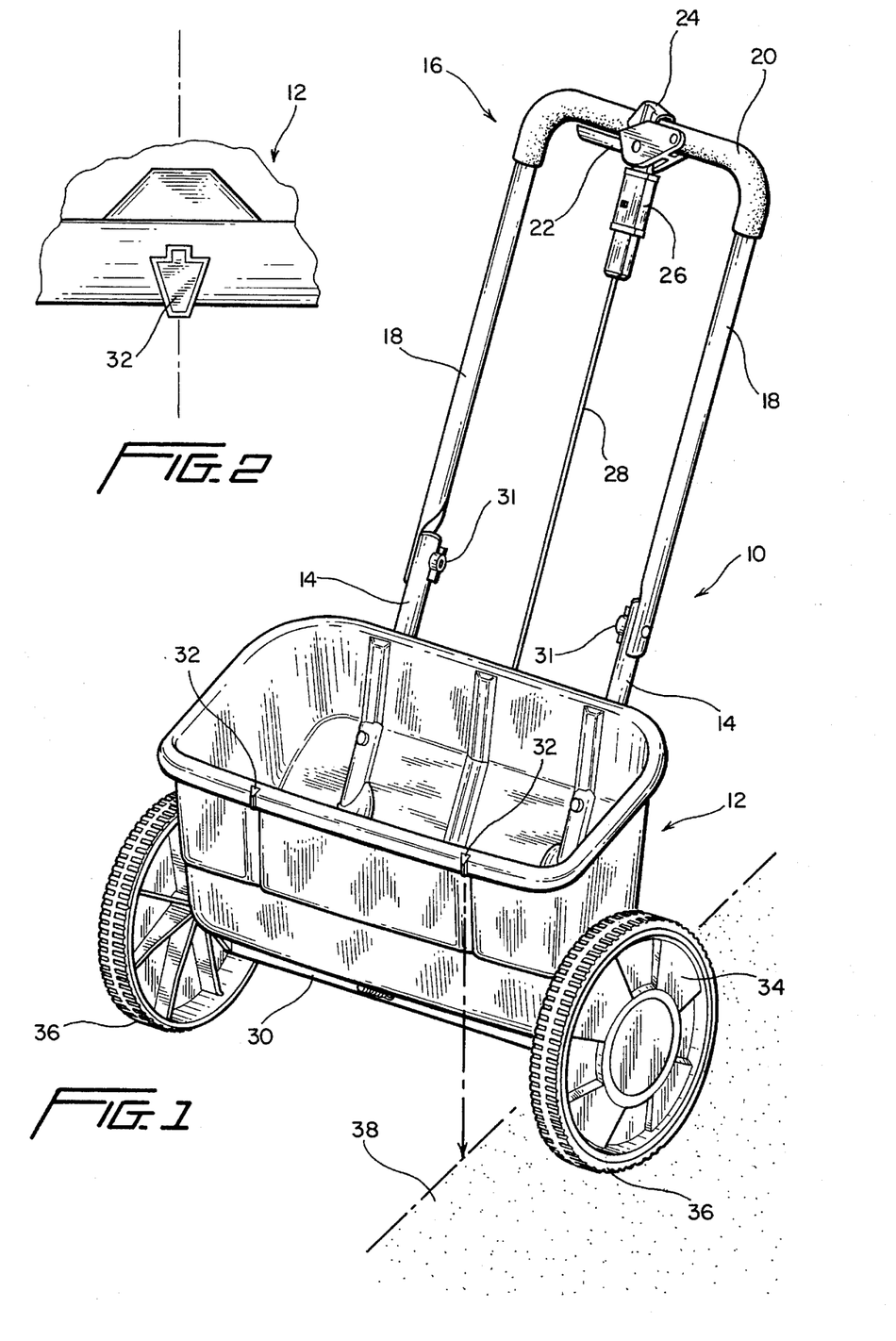
FIG. 1 is a schematic perspective view of the portable wheeled drop spreader according to the invention.
FIG. 2 is a schematic detail of the alignment indexing feature of the drop spreader according to the invention.
Figure 3:
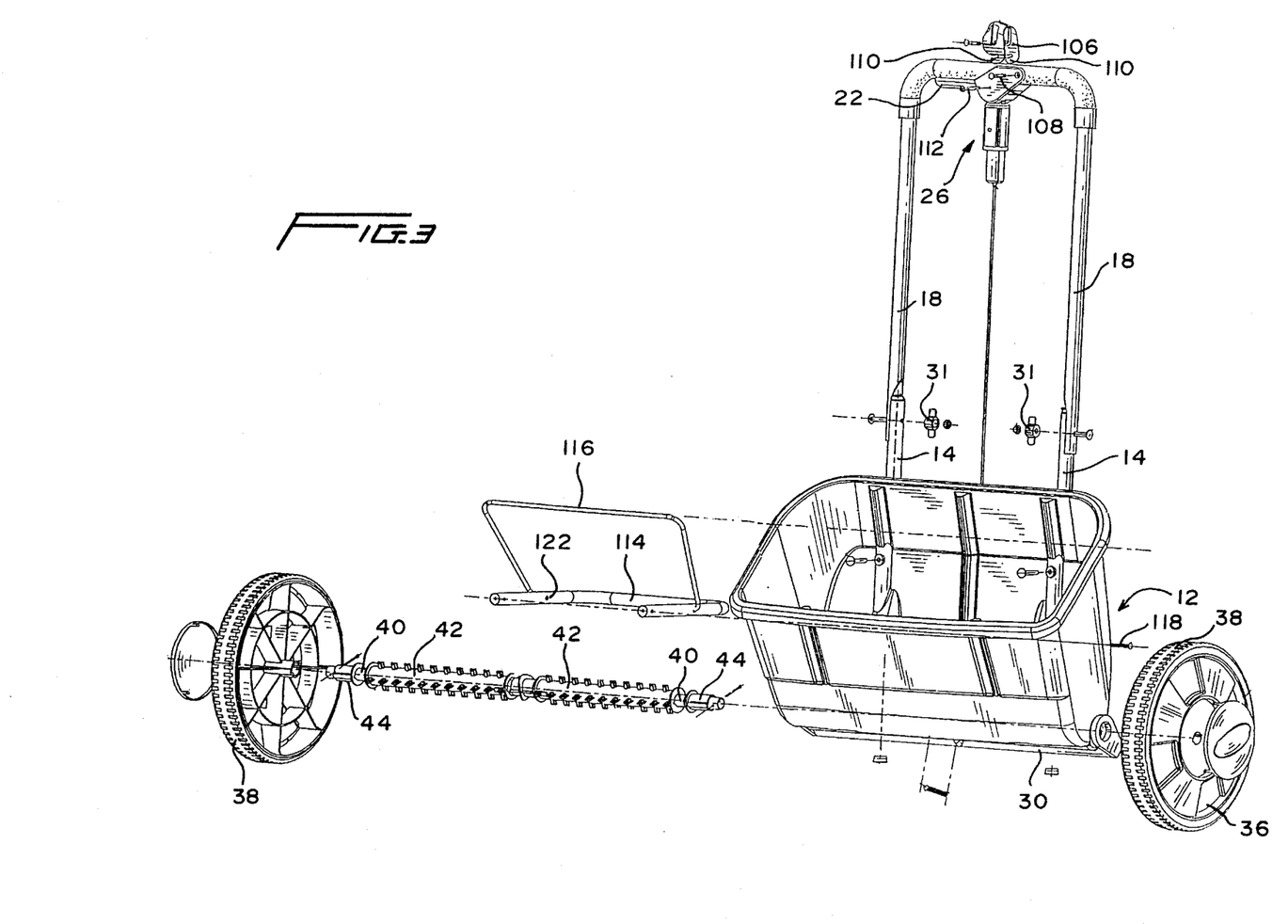
FIG. 3 is a schematic perspective explosive view of the agitator bar as well as the collapsible rest support used in the drop spreader according to the invention.
Figure 11:
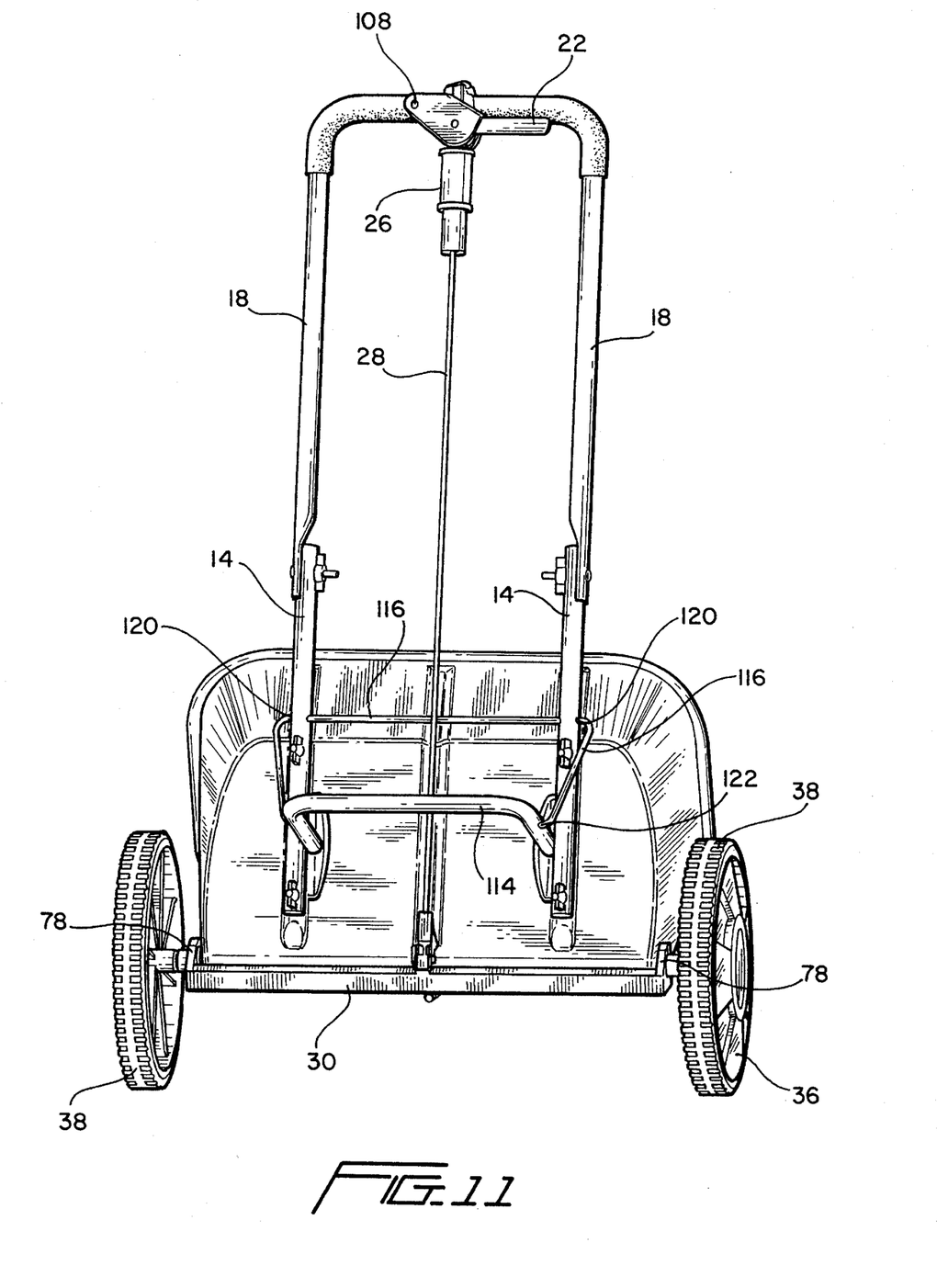
FIG. 11 is a schematic perspective rear view showing the collapsible rest support for the drop spreader according to the invention.

Referring now to FIG. 1 there is shown a drop spreader 10 having a hopper 12 of molded plastic material, a pair of parallel hollow metal tubular leg members 14 secured by suitable fasteners (see below) to the underside of the hopper see FIG. 11), a metal upper frame 16 having generally parallel hollow metal tubular leg members 18 and a handle portion 20 which is covered with a suitable sleeve of foam material for enhancing comfort and gripping action. Also is a control lever 22 pivotally connected to the handle cooperative with a lock-on, lock-off device 24 and a adjustment device 26 to be explained below. The lever 22 controls the flexible cable 28 for operating the shut bar 30 which will also be explained below. Fasteners 31 are shown securing the pivotal connection between the lower leg members 14 and the upper leg members 18 respectively which are shown in their extended state. Fasteners 31 are similar in design to those described in the U.S. Pat. No. to McRoskey, 5,064, 325, having the same assignee as the present invention, the disclosure of which is incorporated herein by reference. Because of the pivotal connection between the upper frame 16 and the parallel leg members 14 attached to the hopper, the spreader 10 can be pivoted to its collapsed state (see FIG. 13) so that the spreader can be stored in a confined space, such as a closet, the back of a truck or the trunk of a car.

With further reference to FIG. 1 there is also shown on the upper front portion of the hopper 12 a pair of spaced apart indexing arrows 32 (see also FIG. 2) which point groundward and whose purpose is to allow the user of the drop spreader to line up one or the other of the arrows 32 (depending upon which direction the spreader is being propelled) with the tire mark or tread 38 left by the thread 36 of the wheel 34 that is adjacent the previously cultivated row. In this way the user of the spreader is assured that the material (seed or fertilizer) that is being dropped from the spreader as the same is propelled forward forms a row which is contiguous with the preceding row of spread material.

Figures 4, 5:
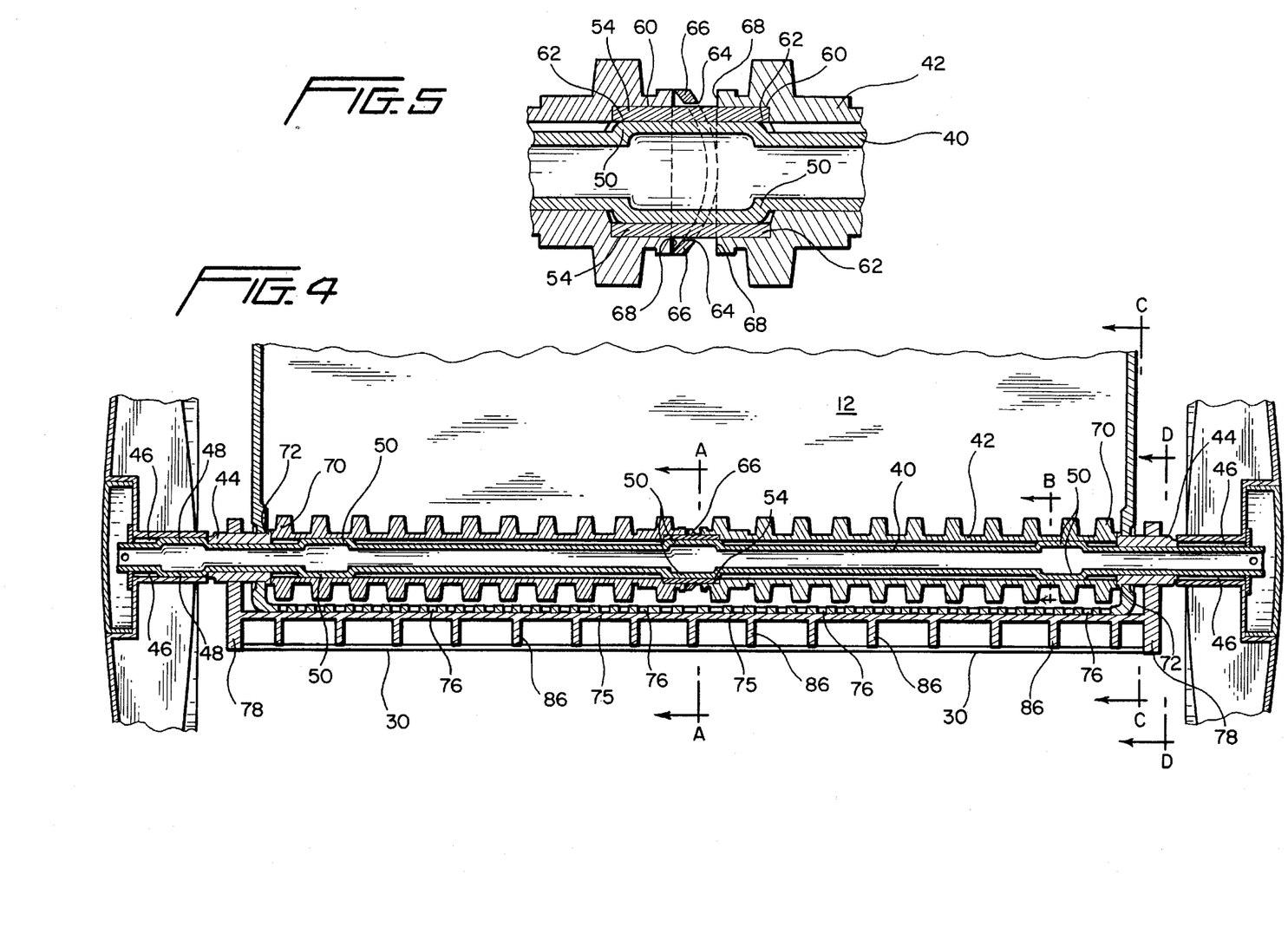
FIG. 4 is a schematic cross-section of the agitator bar, the wheel axle, the shut-off bar and the bearing support members according to the invention.
FIG. 5 is a schematic detail of the spring washer assembly used in the agitator assembly according to the invention.
Figures 6, 7, 8:
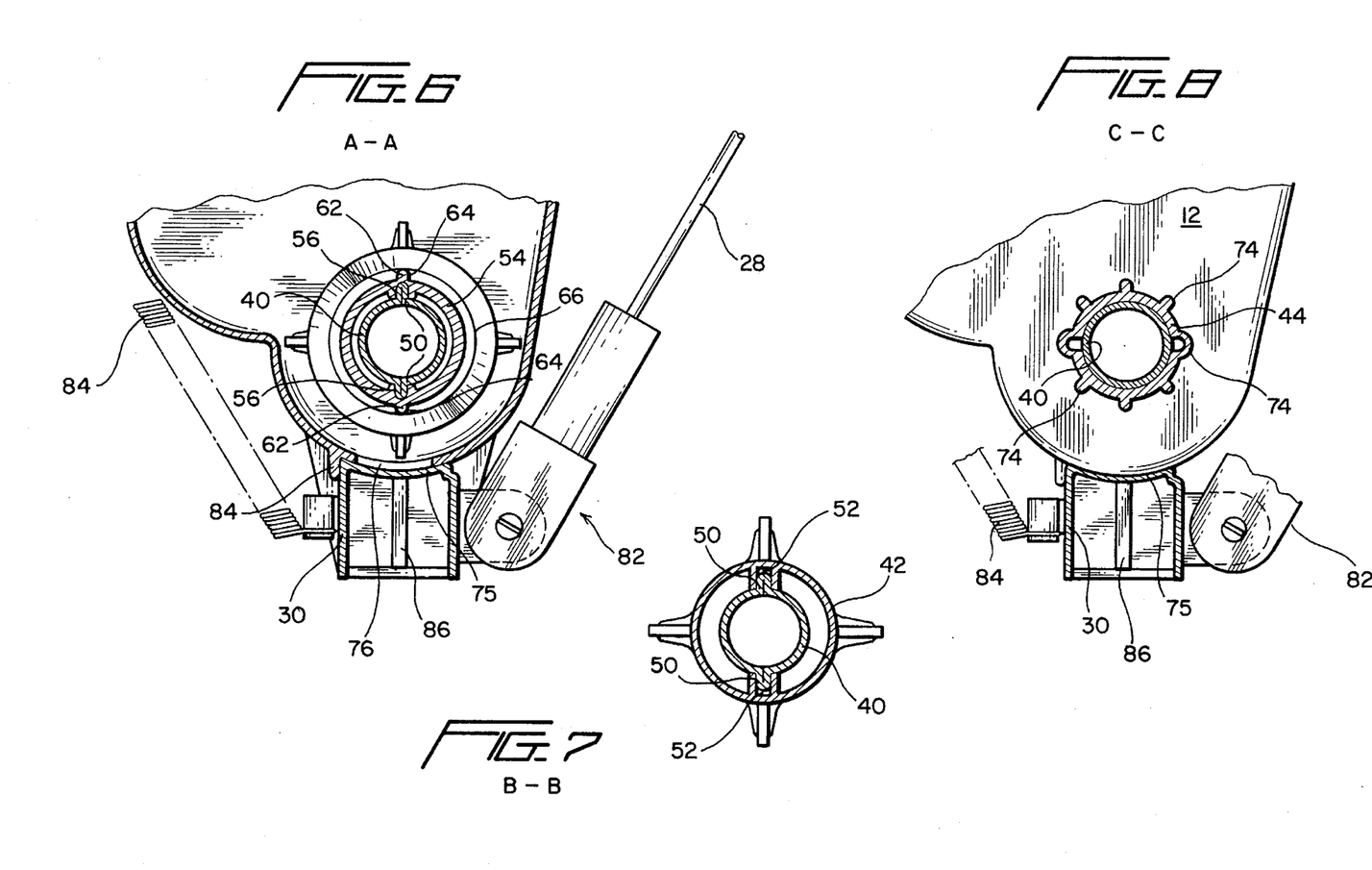
FIG. 6 is an enlarged schematic cross-sectional detail of the spring washer assembly taken along the lines A—A in FIG. 4.
FIG. 7 is a schematic cross section taken along lines B—B in FIG. 4.
FIG. 8 is a schematic cross section taken along lines C—C in FIG. 4.

In FIGS. 3–7 are shown the agitator assembly for the drop spreader according to the invention. This assembly is made up of three related members, a high strength tubular metal wheel axle 40, a pair of molder plastic agitator roller members 42 surrounding the axle, and a pair of plastic bearings 44 for supporting the axle 40. As best shown in FIG. 4 the axle 40 is connected at its extremities to the respective plastic wheels 34 in a well known manner. The hub of one of the wheels, however, will freely rotate about the axle, because its diametrically opposed slots 46 on the inner periphery thereof are not engaged by crimped portions 48 of the axle as the slots in the opposing wheel hub are (see FIG. 4). Further along the axle 40 are opposed crimped portions 50, one set respectively located near each end of the axle but disposed interiorly of the hopper and one set disposed at the center. Each of the agitator roller members 42 is provided with interior diametrically opposed slots 52 that mate with the crimped portions 50 on the axle, as shown, and therefore are keyed to the axle and rotate therewith. While the agitator roller members are fixed for rotation with the axle they are allowed limited axial movement with respect to each other because the slotted interior portions 52 are free to slide axially along the crimped portions 50 of the axle (see FIG. 7). The purpose for this arrangement is to allow a space to exist between the two agitator roller members 42 at the central portion of the hopper interior, that is, where the central crimped portion of the axle 40 is located. Within this space is disposed a sleeve 54 having opposed slots 56 that engage the crimped portions 50 and extend between end faces of the agitator roller members 42, which are provided with annular slots 60 for receiving the sleeve 54, as best shown in FIGS. 5 and 6. On the exterior surface of the sleeve 54 are axially extending rib portions 62 which receive complementary slotted portions 64 of a spring washer member 66 which will be seen to occupy the space between the two end faces 68 of the juxtaposed agitator roller members 42 and so act to bias the agitator roller members away from each other. This action forces the respective distal end faces 70 of the agitator roller members to sealingly engage the flange portions 72 of the bearing members 44 and thereby eliminate any space that might occur therebetween and that otherwise would allow the material in the spreader to gain entry into the bearings 44 for ill effect. It should be noted that because these parts are molded from a plastic material there is more than sufficient flexibility (or viscosity) between them so that they move with respect to one another in a relatively friction-free manner.

Figure 9:
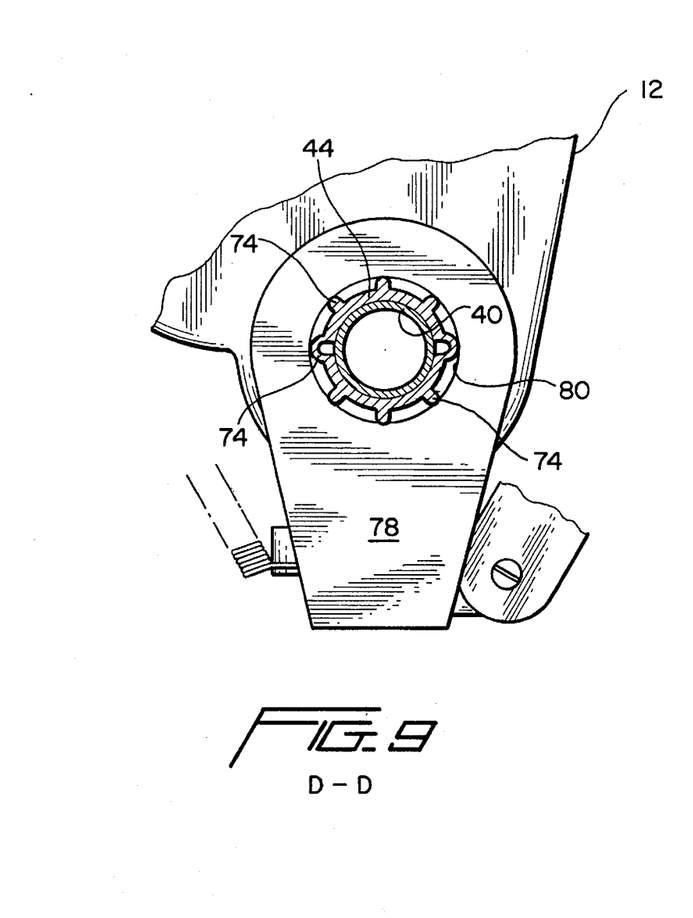
FIG. 9 is a schematic cross section taken along lines D—D in FIG. 4.

FIG. 8 shows one of the bearings 44 extending from the exterior of the hopper, which bearing is provided with a plurality of axially extending ribs or splines 74, whose purpose will be explained shortly. The bearings 44, it will be seen, extend out enough from the respective sides of the hopper 12 so that there is sufficient space on their perimeters for the shut-off bar 30 to be supported and to allow a concave surface 75 of the shut-off bar to ride over the outside convex surface of the hopper in the vicinity of a series of material exit apertures 76 extending substantially the length of the hopper, as shown in FIGS. 4 and 6). Towards this end the shut-off bar 30, as best seen in FIGS. 4, 6 and 9, is provided with ear-like journal support members 78 at its respective distal ends, which members have holes or apertures 80 therein (see FIG. 9) that allow the journal support members 78 to be supported by the splined bearing supports 44, as best shown in FIG. 9. Thus supported, the shut-off bar 30 is operated by movement of the cable 28 via the lever 22 (See FIGS. 1, 6 and 11). Cable 28 is pivotally connected to the central portion of the shut-off bar by means of a pivotal connection assembly 82 of a suitable and conventional design. A spring, such as a coil spring 84, having one end fixed to the lower front portion of the hopper, is connected at its other end to that side of the shut-off bar opposite to the pivotal connection 82 to the cable to thereby bias the shut-off bar against a plurality of stop members 84 (one of which is shown in FIG. 6) extending the length of the hopper parallel to the material exit apertures 76. Thus biased, the shut-off bar is normally disposed in its closed position so that it covers completely the material-exit apertures 76. When the cable is pulled by means of the lever 22 the shut-off bar is effectively rotated about the axle support bearings 44 so that the shut-off bar uncovers the holes 76 by an amount that is dependent upon how much the cable is pulled. As the shut-off bar is rotated about the splined bearing supports 44, whether in an opening or closing direction, the journal support members 78 will ride on the splines 74 which act as individual bearing surfaces that minimize the friction between the journal support members 78 and the bearing support members 44. In this way, too, a non-binding pivotal support is provided between the journal members 78 and the bearing supports 44.

It will also be seen that the shut-off bar is a hollow member (see FIGS. 4, 6 and 8) and is open along the bottom side thereof so that it can be easily molded in one step that will allow, as well, a honey-combed wall structure 86 to be distributed throughout the length of its interior for increasing its stiffness and strength.

Figure 10:
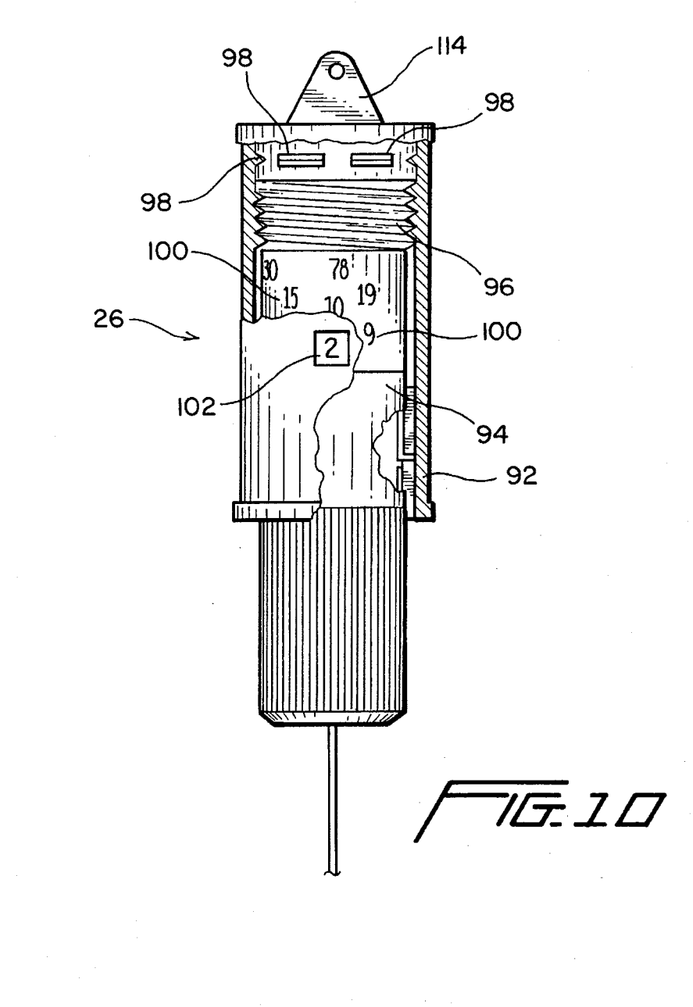
FIG. 10 is a schematic partial cross-section of the micrometer adjustment device used with the drop spreader according to the invention.

FIG. 10 shows in detail the micrometer adjustment device 26 disposed between the control lever handle 22 and the flexible cable 28, which device allows for accurate error-free adjustment for the flowrate of material from the hopper by adjusting how far the shut-off bar 30 rotates past the material exit apertures 76. Determining this distance depends upon the type or size of the granules or seeds being used in the hopper. The micrometer adjustment device is composed of two parts, a cylinder 92 and a barrel portion 94 that extends into the cylinder and varies the overall length of the cylinder-barrel combination depending upon how much the barrel is rotated with respect to the cylinder, thus varying the pull length of the cable 28 and hence the amount the shut-off bar extends past the aperture 76 when the cable is pulled by pivoting the control lever. A somewhat similar device can be seen in FIG. 3 of the U.S. Pat. No. to McRoskey et al, 4,106,704, which disclosure is incorporated herein by reference. In the present case the barrel 94 is seen to have a screw-threaded end portion 96 which engages a single annular array of depending teeth members 98 that operate like a conventional interior thread but simpler in design and easier to mold in place with the cylinder structure and also by virtue of their minimal contact with the threads 96 on the barrel 94 offer bind-free engagement. Surrounding a middle portion of the barrel are a series of indicia 100 in which each separate number is positioned to appear in a window 102 in the cylinder for a given rotation of the barrel; each number corresponding to a particular size opening the shut-off bar 30, specifically the concave surface 75, makes with the material exit apertures 76.

Returning to FIG. 3, a thumb-lock mechanism 24 is shown for the purpose of providing a lock-on control of control lever 22 when it is fully engaged or pulled into the handle 20 for the pull of the shut-off bar 30 to its opened position. The thumb lock device 24 is a U-shaped member 106 that is pivoted by means of a suitable pin to the handle 20 adjacent to where the control lever is pivoted by pin 108 to the handle. The ears or free ends of of the U-shaped member 106 terminate in hooked portions 110 that hook around pin 112 that fits into the apertured bracket 114 (see FIG. 10) on the cylinder portion 92 of the micrometer adjustment device 26. Thus, when the control lever 22 is pulled up against the handle 20 for opening of the aperture in the hopper, the thumb-lock member 106 can be pivoted by means of the user's thumb so as to rotate the hooked portions 110 around the pin 112, thereby camming the control lever in place until such time as the thumb lock is pivoted in a reverse direction to free the lever 22.

Figures 12, 13:
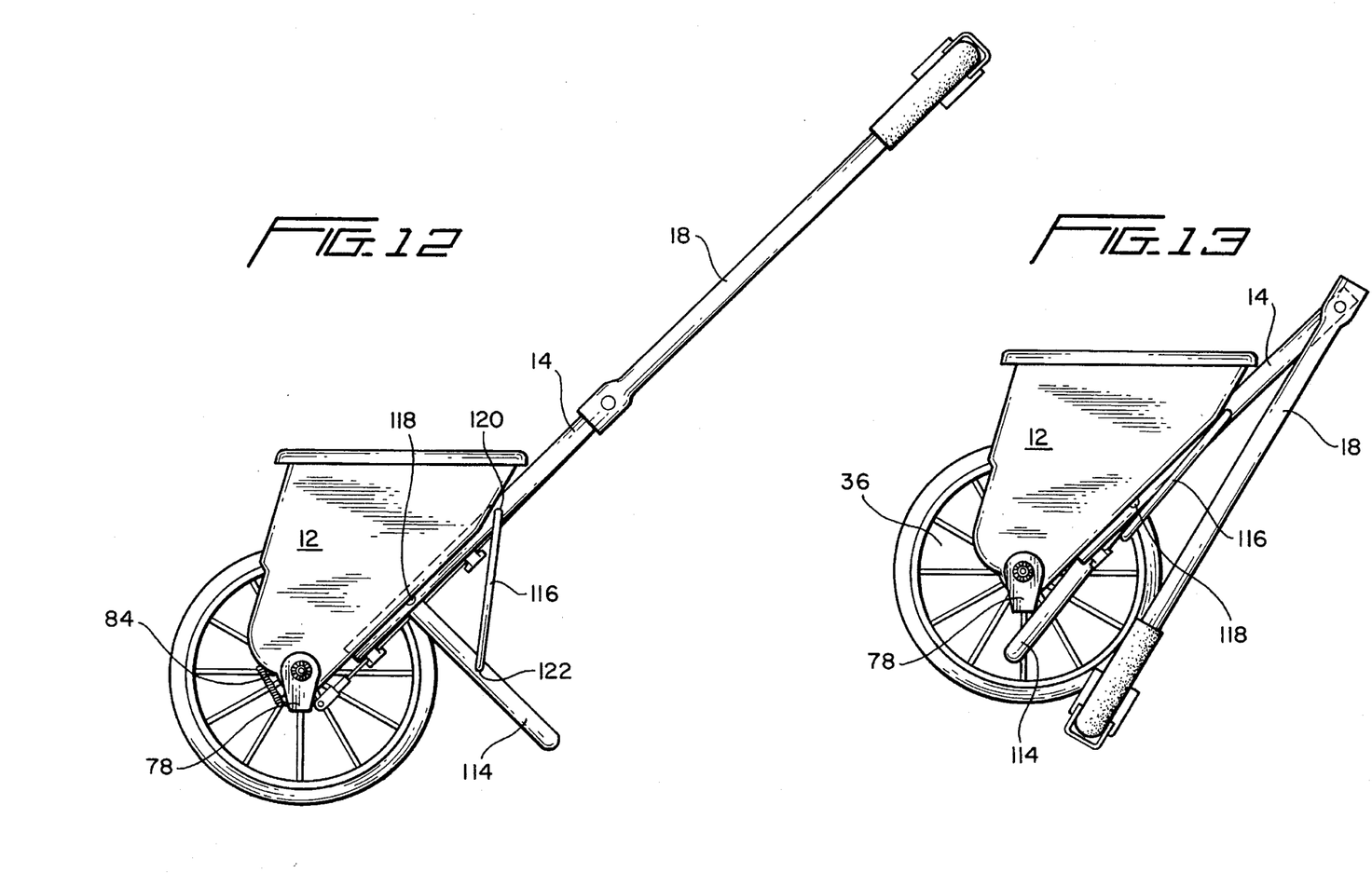
FIG. 12 is a schematic side elevational view of the drop spreader in its extended state according to the invention.
FIG. 13 is a schematic side elevational view of the drop spreader in its collapsed state according to the invention.

Finally, referring to FIGS. 3 and 11–13, the collapsible rest support for the drop spreader is seen to be composed of two members, a U-shaped rigid tubular member 114 and a pliable U-shaped tubular member 116. Like the other tubular parts of the spreader 10, the rigid member 114 is formed from a hollow metal tubular construction in order to lend both strength and lightness to the spreader, while the smaller-diameter U-shaped member 116 is constructed from solid steel in order to be pliable or flexible. It will be noted that the free ends of the U-shaped member 114 are pivotally secured to the respective leg members 14 by suitable fastener pins 118 (see FIG. 3), while the cross-piece of the pliable U-shaped member 114 extends through apertures 120 for rotation thereabout in the same leg members 14. The free ends of the pliable U-shaped member 116 are inserted into apertures 122 of the rigid U-shaped member 114 when the rest support is moved to its extended position, as shown in FIG. 12. It should be noted, too, that in this position the pliability of the U-shaped member 116—which is important for allowing the free ends to be either inserted or removed from the apertures 122 in the rigid U-shaped member 114—is of no consequence because the U-shaped member 116 lies in a substantially vertical plane, so that the weight of the spreader produces only a compressive force along the length or axes of the vertically aligned bars and does not affect their inherent rigidity in the axial dimension.

When the spreader is moved to its collapsed state by unloosening the fasteners 31 (see FIG. 13), all that is necessary to place the rest support in its collapsed state is to bend the pliable leg members of the U-shaped member 116 from their engagement with the respective apertures in the rigid U-shaped member 114 and then pivot both U-shaped members to their collapsed state, as shown.

The foregoing relates to a preferred exemplary embodiment of the present invention, it being understood that other embodiments and variants thereof are possible within the scope of the invention, the latter being defined by the appended claims.

What is claimed and desired to be secured by Letters Patent of the United States is:

1. A drop spreader comprising, a frame and handle member, a hopper connected to said frame and handle member, a material exit aperture means in said hopper extending substantially the length thereof, a wheel-bearing axle extending through a bottommost portion in said hopper, bearing means for said axle journaled at opposing end apertures of said hopper, an agitator means comprising a pair of hollow roller members surrounding said axle in tandem, keying means on said axle for keying said agitator means to said axle to rotate therewith, said roller members being free to slide axially with respect to said axle, and spring washer means disposed between said roller members of said agitator means for biasing said roller members axially apart from each other respectively towards said bearing means at opposite ends of said hopper.

2. A drop spreader according to claim 1, wherein said bearing means comprises an annular flange portion and said roller members of said agitator means comprise complementary flange portions which bear against said flange portion of said bearing means.

3. A drop spreader according to claim 1, further comprising a generally hollow shut-off bar pivotally mounted adjacent said bottommost portion of said hopper, said shut-off bar having reinforcing wall portions distributed within the hollow portion thereof, and spring means biasing said shut-off bar into a position extending over said aperture means.

4. A drop spreader according to claim 3, further comprising a flexible cable having one end pivotally connected to said shut-off bar and the other end thereof connected to a control lever located on said frame and handle member for moving said shut-off bar via said cable from a closed position to an open position with respect to said aperture means.

5. A drop spreader comprising,
   a frame and handle member,
   a hopper connected to said frame and handle member,
   a material exit aperture means in said hopper extending substantially the length thereof,
   a wheel-bearing axle extending through a bottommost portion of said hopper for supporting a pair of wheels having a tread thereon,
   bearing means for said axle journaled at opposing end apertures of said hopper,
   an agitator means surrounding said axle and rotating therewith,
   a shut-off bar adjacent said material exit aperture means pivoted about said bearing means, and
   a pair of spaced apart wheel track alignment indexing means disposed on the front of said hopper for enabling a user of said drop spreader to align the tread mark from said tread of one of said wheels with one of said indexing means to thereby assure that the material exiting from said hopper forms contiguous rows of spread material.

6. A drop spreader comprising,
   a frame and handle member,
   a hopper connected to said frame and handle member,
   a material exit aperture means in said hopper extending substantially the length thereof,
   a wheel-bearing axle extending through a bottommost portion of said hopper,
   an agitator means surrounding said axle and rotating therewith,
   bearing means for said axle journaled in opposing end apertures of said hopper and extending exteriorly thereof, said bearing means having an axially extending array of splines on the outer surface thereof, and
   a shut-off bar adjacent said material exit aperture means and having journal support means rotatably disposed about said splines on said bearing means.

7. A drop spreader according to claim 6, where in said shut-off bar is generally hollow with a longitudinally extending opening and having reinforcing wall portions distributed within the hollow portion thereof.

8. A drop spreader comprising,
   a frame having generally parallel spaced apart leg members,
   a hopper connected to said leg members of said frame,
   a material exit aperture means in said hopper extending substantially the length thereof,
   a wheel-bearing axle extending through a bottommost portion of said hopper,
   bearing means for said axle journaled at opposing end apertures of said hopper,
   an agitator means surrounding said axle and rotatable therewith,
   a shut-off bar pivotally mounted about said bearing means adjacent said bottommost portion of said hopper,
   spring means biasing said shut-off bar into a position extending over said aperture means, and
   a collapsible support means for supporting said hopper in an upright position, said support means comprising a rigid U-shaped tubular member having its free ends pivotally supported by said leg members of said frame, and a pliable U-shaped tubular member having its cross-member pivoted to said leg members of said frame and having its free ends releasably disposed in respective apertures in said rigid U-shaped tubular member.

9. A drop spreader according to claim 8, wherein said pliable U-shaped tubular member when pivoted so as to have its free ends disposed in said respective apertures in said said rigid U-shaped tubular member occupies a generally vertical plane, whereby the weight of said spreader is substantially compressive along the parallel axes of said pliable U-shaped tubular member.

10. A collapsible drop spreader having all pre-assembled parts comprising,
    a hopper,
    a material exit aperture means in said hopper extending substantially the length thereof,
    a wheel-bearing axle extending through a bottommost portion of said hopper,
    bearing means for said axle journaled at opposing end apertures in said hopper,
    an agitator means surrounding said axle and rotatable therewith,
    a shut-off bar having journal means pivotally mounted about said bearing means adjacent said bottommost portion of said hopper,
    spring means biasing said shut-off bar into a position covering said aperture means,
    a pair of spaced apart generally tubular leg members supported by said hopper
    a U-shaped frame, the free ends of said U-shaped frame being pivoted respectively to said leg members supported by said hopper, said U-shaped frame forming a handle means for said spreader when said U-shaped frame is in an extended position,
    fastener means for tightening and loosening the pivotal connections between said U-shaped frame and said leg members supported by said hopper,
    a flexible cable having one end pivotally connected to said shut-off bar and the other end thereof connected to a control lever located on said handle of said upper frame for moving said shut-off bar via said cable from a closed position to an open position with respect to said aperture means, and
    a collapsible support means for supporting said hopper in an upright position, said support means comprising a rigid U-shaped tubular member having its free ends pivotally supported by said leg members supported by said hopper, and a pliable U-shaped tubular member having its cross-member pivoted to said leg members supported by said hopper and its free ends releasably disposed in respective apertures in said rigid U-shaped tubular member.

11. A collapsible drop spreader according to claim 10, further comprising a micrometer adjustment means connected between said control lever and said flexible cable for varying the size of opening said shut-off bar makes with said aperture means, said micrometer adjustment means including a cylinder portion connected to said control lever and having a window therein, a barrel member connected to said flexible cable and threaded into said cylinder, said barrel member having spirally arranged indicia thereon for appearing in said window as said barrel is turned with respect to said cylinder.

12. A drop spreader according to claim 11, wherein a part of the interior surface of said cylinder portion is defined by an annular array of teeth members for engaging a threaded portion of said barrel member.

13. A collapsible spreader according to claim 12, wherein there is further provided a lock-on lock-off means pivotally connected to said upper frame adjacent said control lever and having a cam means for cooperating with a pin means on said control lever connected to said micrometer adjustment means for maintaining said control lever in a fully extended position when said lock-on lock-off means is pivoted to one of its extreme positions.

* * * * *